United States Patent
Goss et al.

(10) Patent No.: US 11,392,304 B2
(45) Date of Patent: Jul. 19, 2022

(54) DATA STORAGE DEVICE WITH ADAPTIVE OBJECT STORAGE CAPABILITIES

(71) Applicant: Seagate Technology LLC, Fremont, CA (US)

(72) Inventors: Ryan James Goss, Prior Lake, MN (US); Daniel John Benjamin, Savage, MN (US); David W. Claude, Loveland, CO (US); Graham David Ferris, Savage, MN (US); Ryan Charles Weidemann, Victoria, MN (US)

(73) Assignee: SEAGATE TECHNOLOGY LLC

( * ) Notice: Subject to any disclaimer, the term of this patent is extended or adjusted under 35 U.S.C. 154(b) by 0 days.

(21) Appl. No.: 15/929,920

(22) Filed: May 29, 2020

(65) Prior Publication Data

US 2021/0373785 A1 Dec. 2, 2021

(51) Int. Cl.
*G06F 3/06* (2006.01)
*G06F 12/02* (2006.01)
*G06F 11/10* (2006.01)

(52) U.S. Cl.
CPC .......... *G06F 3/0629* (2013.01); *G06F 3/0614* (2013.01); *G06F 3/0679* (2013.01); *G06F 3/0689* (2013.01); *G06F 11/1012* (2013.01); *G06F 12/0253* (2013.01)

(58) Field of Classification Search
CPC .... G06F 3/0629; G06F 3/0614; G06F 3/0689; G06F 12/0253; G06F 12/02; G06F 11/1012; G06F 3/06
See application file for complete search history.

(56) References Cited

U.S. PATENT DOCUMENTS

| | | | |
|---|---|---|---|
| 7,124,152 B2 | 10/2006 | Fish | |
| 8,302,178 B2 | 10/2012 | Camiel | |
| 8,356,061 B2* | 1/2013 | Vengerov | G06F 12/0253 707/813 |
| 9,182,926 B2 | 11/2015 | Naganuma et al. | |
| 9,558,363 B2 | 1/2017 | Whalley et al. | |
| 10,126,964 B2 | 11/2018 | Munsil et al. | |

(Continued)

OTHER PUBLICATIONS

G. O. Puglia, A. F. Zorzo, C. A. F. De Rose, T. Perez and D. Milojicic, "Non-Volatile Memory File Systems: A Survey," in IEEE Access, vol. 7, pp. 25836-25871, 2019, doi: 10.1109/ACCESS.2019. 2899463.*

*Primary Examiner* — Pierre Michel Bataille
(74) *Attorney, Agent, or Firm* — Hall Estill Law Firm

(57) ABSTRACT

Apparatus and method for object storage, such as a solid-state drive (SSD) or array thereof. In some embodiments, data arranged as an object are presented for storage to a non-volatile memory (NVM) of a data storage device. Prior to storage, a configuration of the NVM is adaptively adjusted, such as by adjusting a garbage collection unit (GCU) layout, an error correction code (ECC) scheme, and/or a map metadata format used by the NVM. The object is thereafter stored to the NVM using the adaptively adjusted configuration. A controller of the data storage device generates a predicted remaining storage capacity of the NVM in terms of additional objects that can be stored by the NVM responsive to the adaptively adjusted configuration of the NVM. A non-linear sliding scale may be used such that a greater number of smaller objects or a smaller number of larger objects may be accommodated.

20 Claims, 7 Drawing Sheets

(56) References Cited

U.S. PATENT DOCUMENTS

| | | | |
|---|---|---|---|
| 10,430,084 B2 * | 10/2019 | Goss | G06F 3/0655 |
| 2006/0174310 A1 | 8/2006 | Lee et al. | |
| 2016/0098229 A1 * | 4/2016 | Schreiber | G06F 9/5022 |
| | | | 711/166 |
| 2018/0210828 A1 * | 7/2018 | Zhou | G06F 3/06 |
| 2019/0065367 A1 * | 2/2019 | Li | G06F 12/0891 |
| 2020/0125568 A1 * | 4/2020 | Idicula | G06F 16/24545 |

* cited by examiner

DATA FLOW

METADATA (MAP) FORMAT

FILE FORMAT

OBJECT FORMAT

DATA STORAGE DEVICE WITH ADAPTIVE OBJECT STORAGE CAPABILITIES

SUMMARY

Various embodiments of the present disclosure are generally directed to the storage of data in the form of objects.

In some embodiments, data arranged as an object are presented for storage to a non-volatile memory (NVM) of a data storage device. A configuration of the NVM is adaptively adjusted, and the object is stored using the adaptively adjusted configuration. A predicted remaining storage capacity of the NVM is generated in terms of additional objects that can be stored by the NVM in view of the adaptively adjusted configuration. Without limitation, the adjustments can include a garbage collection unit (GCU) layout, an error correction code (ECC) scheme, and/or a map metadata format used by the NVM. The predicted remaining storage capacity can be expressed as a non-linear sliding scale such that a greater number of smaller objects or a smaller number of larger objects may be accommodated.

These and other features which may characterize various embodiments can be understood in view of the following detailed discussion and the accompanying drawings.

DETAILED DESCRIPTION

Figure 1:
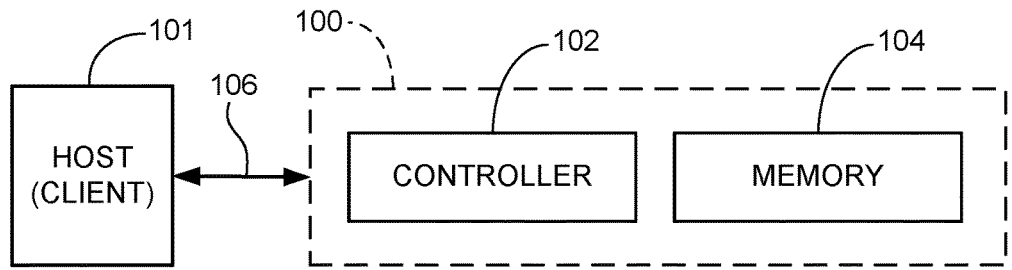
FIG. 1 provides a functional block representation of a data storage device in accordance with various embodiments.

Data storage devices are used to store and retrieve computerized data in a fast and efficient manner. A currently popular form of storage device is a solid-state drive (SSD), which uses solid-state non-volatile memory (NVM) as a main memory store for user data from a client device. The NVM in an SSD is usually configured as three-dimensional (3D) NAND flash memory, but other forms of solid-state memory can be used. While SSDs are particularly useful in providing fast data transfer performance, other forms of data storage devices are commonly employed such as magnetic disc recording devices, optical disc recording devices, magnetic tape drives, hybrid storage drives, etc.

Traditionally, data storage devices have been used as block storage devices. A block storage device interfaces with the computational environment on the basis of blocks of user data. The blocks usually have a fixed size, such as 512 bytes (B), 4096B (4 KB), etc., where one (1) byte, B equals eight (8) bits, b.

In a block storage environment, the client presents the data to be stored as an arrangement of blocks, and the storage device operates to manage the storage of the blocks to the NVM. Such transfers to the NVM are provided in the form of a write operation, and the blocks of user data to be written are supplied by the client with the write command. When the client device requests the stored data to be returned from the NVM, a read command is issued and the storage device operates to retrieve and process the blocks for transfer back to the requesting client.

Both the write commands and the read commands identify the associated blocks using a suitable logical addressing scheme, such as logical block addresses (LBAs). Various internal control operations are carried out by the storage device to track the locations of the blocks, to apply error detection and correction techniques to protect the integrity of the data blocks, etc. Nevertheless, the storage device has little knowledge regarding the significance or association of the blocks, and treats the blocks as individual storage units that can each be independently written, retrieved and updated by the client as desired.

File storage systems are another way in which data can be stored to one or more storage devices. A file level storage system generally operates to provide a file to be stored to the NVM of the storage device (or an array of storage devices). The file is identified by a file name, and the content of the file is broken up into a series of fixed sized blocks.

Storage devices handle file storage in a manner similar to that of block storage; the content of the file is broken up into fixed sized blocks, and these blocks are stored and protected in a manner that is essentially the same as is used for block storage. A file allocation table (FAT) or similar data structure can be used to track which blocks are associated with each file. It will be noted that in a block storage environment the FAT operations are typically handled at the client level, while in a file storage environment the FAT operations may be handled at the storage device level.

One advantage of a file storage system is that, from the standpoint of the storage device, the blocks making up a particular file are known to constitute a cohesive group, and so a file based storage system can utilize mechanisms to treat the associated group of storage blocks as a unit, and can take steps to arrange the storage and retrieval of such groups in an efficient manner.

Object storage systems operate in a fundamentally different manner as compared to block storage and file storage systems. In an object storage system, the focus is upon treating a set of data as an object, which comprises a self-contained agglomeration of data bits that are stored and retrieved as a unit. As a result, objects are not like files or blocks which are updated in place; rather, an object is given to a data storage device to store, and then the object is retrieved for use by the client device. If updates are desired to an object, the updates usually take place at the client level, and a new, replacement object is presented for storage by the storage device.

Current generation storage devices are capable of being used to store objects, but tend to do so by internally treating the objects as files or blocks. There accordingly exists a need for improvements in the manner in which data storage devices process the storage and retrieval of objects to meet the present and future operational needs of the users of such objects.

Various embodiments of the present disclosure are directed to an apparatus and method for processing objects. As explained below, some embodiments provide a data storage device with a controller and an NVM. The controller provides top level control of the storage device, and the NVM provides persistent storage capabilities of data presented for storage by a client device. It is contemplated that the storage device may take the form of one or more SSDs which utilize 3D NAND flash memory as the NVM, but other configurations can be used as desired, so the use of one or more SSDs with flash memory is merely illustrative and are not limiting.

Some embodiments entail the storage of data in the form of one or more objects to the NVM. The storage device adaptively configures the physical storage space, the ECC scheme, and/or the metadata mapping system in a way that efficiently stores and tracks the object. If the object has a relatively smaller overall size, the object may be treated as a unitary set of data. If the object has a relatively larger overall size, the object may be divided into portions, with each object portion treated as a unitary set of data.

In some cases, a garbage collection unit (GCU) size and layout is selected to store the object (or the individual object portions). GCUs are units of storage that are allocated and erased as a unit, and the arrangement of the GCUs can be optimized for the storage of the object/portions.

In further cases, an error correction scheme is tailored for use in the storage and retrieval of the object/portions. ECC systems provide fault tolerance in that selected numbers of bit errors can be detected and corrected during data transfers into and out of the main memory store. A suitable ECC scheme can be selected to match the requirements of the GCU layout and data arrangement.

In still further cases, map metadata of the NVM can be adaptively adjusted in response to the size and number of the objects stored to the NVM. A metadata footprint can be expressed as a ratio of user data bits in the one or more objects to metadata bits used by the storage device to describe the user data bits.

In yet additional cases, the storage device estimates a remaining capacity of unused portions of the NVM to accommodate one or more additional objects based on the adaptive selection of GCU, ECC and/or metadata layouts.

In this way, the data storage device is adapted to store user objects based on the size and number of objects that are presented for storage. Because objects are not stored as traditional file and block storage systems, the actual remaining amount of useful data storage capacity will depend on the way in which the storage device has been utilized. Various embodiments thus evaluate current and future planned usage to enable users to assess the availability of the storage device to accommodate further objects.

These and other features and advantages of various embodiments of the present disclosure can be understood beginning with a review of FIG. 1 which provides a functional block representation of a data storage device 100. The data storage device 100 is coupled to an external host (client) device 101 to form a data computational system such as in a computer network. The storage device 100 incorporates a controller 102 and a memory module 104.

The controller 102 represents a hardware based and/or programmable processor based circuit configured to provide top level communication and control functions. The memory module 104 includes non-volatile memory (NVM) for the persistent storage of user data. Substantially any type or types of NVM can be used.

During normal operation, the client device 101 issues data access commands to the storage device 100, such as read and write commands. Write commands are serviced by writing data supplied from the client to the NVM. Read commands are serviced by locating and retrieving data requested by the client, from the NVM and transferring the retrieved data to the client. Data transfers occur using a suitable client (host) interface 106.

Figure 2:
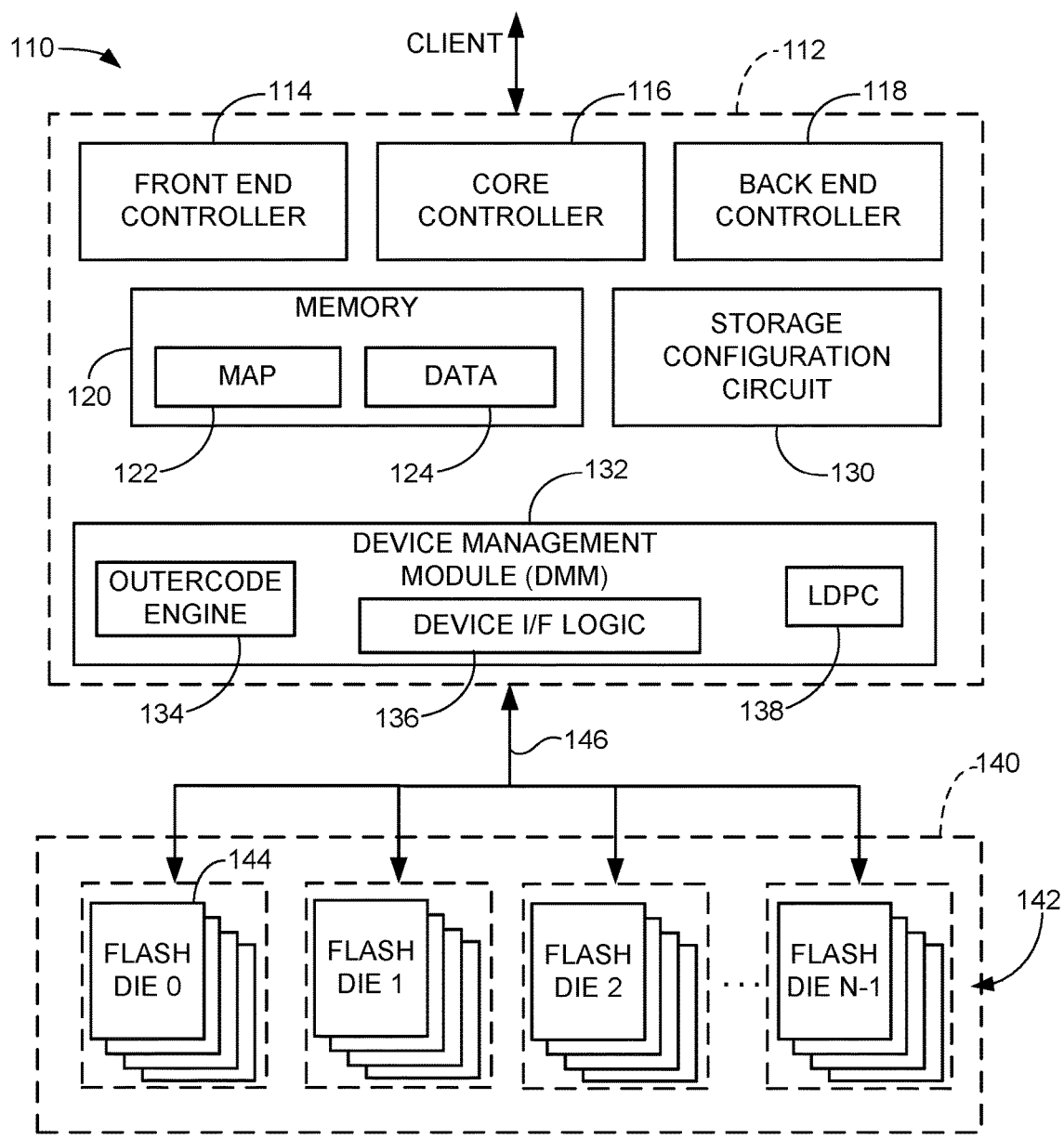
FIG. 2 shows aspects of the device of FIG. 1 characterized as a solid state drive (SSD) in accordance with some embodiments.

FIG. 2 shows a data storage device 110 as a particular embodiment of the device 100 in FIG. 1. The device 110 is configured as a solid state drive (SSD) that communicates with one or more client devices via one or more Peripheral Component Interface Express (PCIe) ports. The NVM is contemplated as comprising NAND flash memory, although other forms of solid state non-volatile memory can be used.

In at least some embodiments, the SSD operates in accordance with the NVMe (Non-Volatile Memory Express) Standard, which enables different users to allocate NVM sets (die sets) for use in the storage of data, Each die set may form a portion of an NVMe namespace that may span multiple SSDs or be contained within a single SSD.

The SSD 110 includes a controller circuit 112 that generally corresponds to the controller 102 of FIG. 1. The controller circuit 112 includes a front end controller 114, a core controller 116 and a back end controller 118. The front end controller 114 performs host I/F functions, the back end controller 118 directs data transfers with the memory module 114 and the core controller 116 provides top level control for the device.

Each controller 114, 116 and 118 includes a separate programmable processor with associated programming (e.g., firmware, FW) in a suitable memory location, as well as various hardware elements to execute data management and transfer functions. This is merely illustrative of one embodiment; in other embodiments, a single programmable processor (or less/more than three programmable processors) can be configured to carry out each of the front end, core and back end processes using associated FW in a suitable memory location. A pure hardware based controller configuration can alternatively be used. The various controllers may be integrated into a single system on chip (SOC) integrated circuit device, or may be distributed among various discrete devices as required.

A controller memory 120 represents various forms of volatile and/or non-volatile storage memory (e.g., SRAM, DDR DRAM, flash, etc.) utilized as local memory by the controller 112. Various data structures and data sets may be stored by the memory including one or more metadata map structures 122 and one or more sets of user data 124 that are cached or buffered during data transfers with a client (e.g., 101, FIG. 1).

A storage configuration circuit 130 forms a portion of the overall controller functions of the SSD 110. As explained below, the storage configuration circuit 130 equips the SSD to efficiently process the storage of a variety of different types of data in different operational environments, including objects in an object storage system.

A device management module (DMM) 132 supports back end processing operations. The DMM 132 includes an outer code engine circuit 134 to generate outer code, a device I/F logic circuit 136 to provide data communications, and a low density parity check (LDPC) circuit 138 configured to generate LDPC codes as part of an error detection and correction strategy used to protect the data stored by the by SSD 110.

A memory module 140 corresponds to the memory 104 in FIG. 1 and includes a non-volatile memory (NVM) in the form of a flash memory 142 distributed across a plural number N of flash memory dies 144. Rudimentary flash memory control electronics (not separately shown in FIG. 2) may be provisioned on each die 144 to facilitate parallel data transfer operations via a number of channels (lanes) 146.

Figure 3:
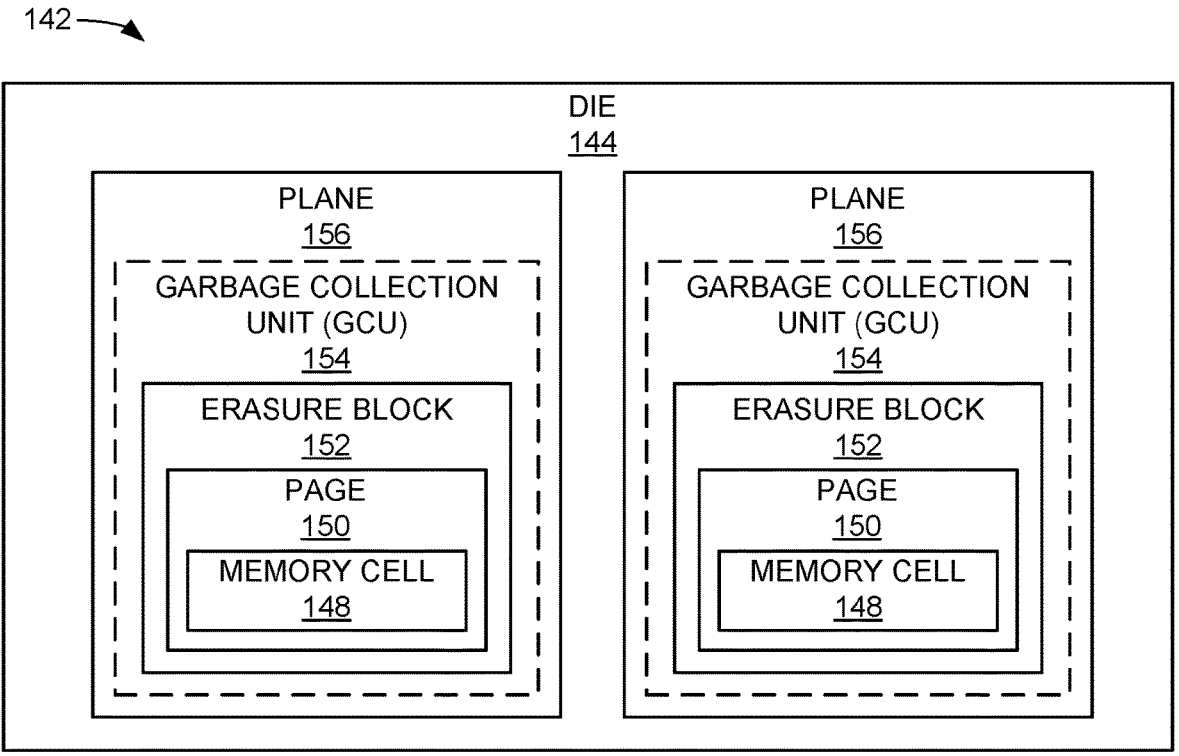
FIG. 3 shows an arrangement of the flash memory of FIG. 2 in some embodiments.

FIG. 3 shows a physical/logical arrangement of the various flash memory dies 144 in the flash memory 142 of FIG. 2 in some embodiments. Each die 144 incorporates a large number of flash memory cells 148. The cells may be arrayed in a two-dimensional (2D) or three-dimensional (3D stacked) arrangement with various control lines (e.g., source, bit, word lines) to access the cells.

Groups (e.g., rows) of cells 148 are interconnected to a common word line to accommodate pages 150, which represent the smallest unit of data that can be accessed at a time. Depending on the storage scheme, multiple pages of data may be written to the same physical row of cells, such as in the case of MLCs (multi-level cells), TLCs (three-level cells), XLCs (four-level cells), and so on. Generally, n bits of data can be stored to a particular memory cell 148 using $2^n$ different charge states (e.g., TLCs use eight distinct charge levels to represent three bits of data, etc.). The storage size of a page can vary; some current generation flash memory pages are arranged to store 32 KB (32,768 bytes) of user data.

The memory cells 148 associated with a number of pages are integrated into an erasure block 152, which represents the smallest grouping of memory cells that can be concurrently erased in a NAND flash memory. A number of erasure blocks 152 are in turn incorporated into a garbage collection unit (GCU) 154, which are logical storage units that utilize erasure blocks across different dies. GCUs are allocated and erased as a unit.

During operation, a selected GCU is allocated for the storage of user data, and this continues until the GCU is filled. Once a sufficient amount of the stored data is determined to be stale (e.g., no longer the most current version), a garbage collection operation can be carried out to recycle the GCU. This includes identifying and relocating the current version data to a new location, followed by an erasure operation to reset the memory cells to an erased (unprogrammed) state. The recycled GCU is returned to an allocation pool for subsequent allocation to begin storing new user data. In one embodiment, each GCU 154 nominally uses a single erasure block 152 from each of a plurality of dies 144, such as 32 dies.

Each die 144 may further be organized as a plurality of planes 156. Examples include two planes per die as shown in FIG. 3, although other numbers of planes per die, such as four planes per die, etc. can be used. Generally, a plane is a subdivision of the die 144 arranged with separate read/write/erase circuitry such that a given type of access operation (such as a write operation, etc.) can be carried out simultaneously by each of the planes to a common page address within the respective planes.

Figure 4:
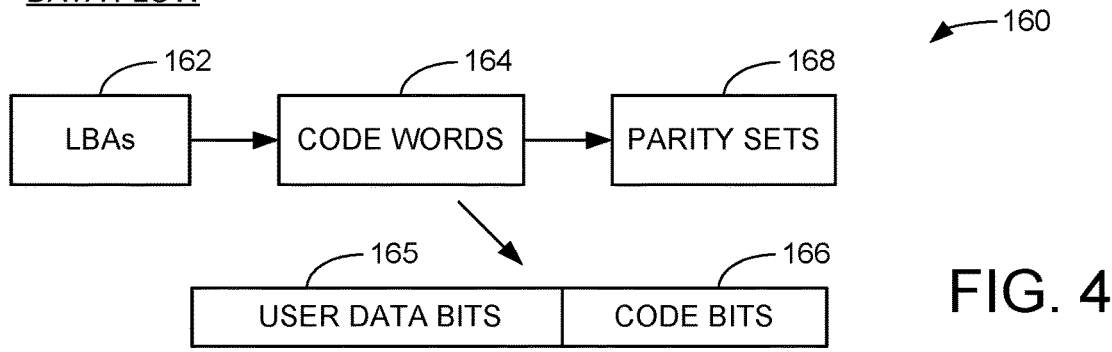
FIG. 4 illustrates a data flow of the SSD of FIG. 2.

FIG. 4 provides a data flow sequence 160 to describe the processing of input user data from a client device such as 101 in FIG. 1. Other arrangements can be used. User data blocks with associated logical addresses are represented at 162. The logical addresses may be logical block addresses (LBAs), but other forms can be used including key values, virtual block addresses, etc. Prior to storage in the flash memory 142, the blocks are accumulated into code words 164, which include user data bits 165 and ECC bits 166. The ECC bits may take the form of LDPC (low density parity check) bits and are used in decoder circuitry to correct bit errors in the user data bits during a read operation.

A selected number of the code words may be arranged into pages, and a selected number of pages may in turn be arranged into parity sets 168. In one non-limiting example, 31 pages of code words are combined such as through an exclusive-or (XOR) operation to generate a parity value as a $32^{nd}$ page, and then all 32 pages of the parity set is written to a selected GCU. The parity value operates as outer code. Using a GCU size of 32 erasure blocks with one erasure block from each die, the outer code can facilitate data recovery even in the instance of a single die failure.

Figure 5:
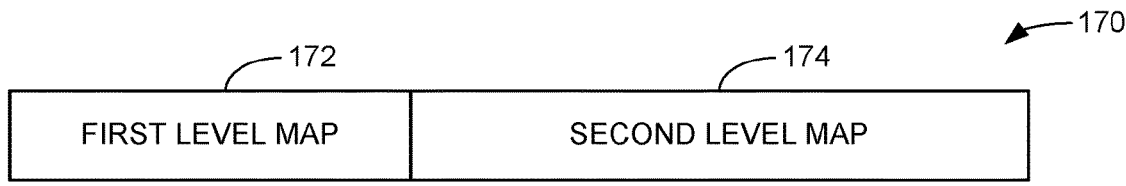
FIG. 5 is a format for metadata used by the SSD arranged as a two-level map.

FIG. 5 shows an arrangement of map metadata 170 used to track the storage of the user data structures from FIG. 4. The map metadata is arranged as a two level map. Other mapping structures can be used including a single level map, a multi-level map with more than two levels, etc. The map 170 includes a first level map 172 and a second level map 174.

The second level map 174 provides second level map entries that operate as a flash transition layer (FTL) with a physical to logical association of addresses to enable location of the desired user data blocks. The first level map 172 provides first level map entries that identify the locations of the second level entries. The map data are stored to the flash and retrieved to local memory as needed. The map data entries may be arranged in a manner similar to the way in which user data are stored, such as dividing the map data into code words, arranging the code words into pages, arranging the pages into parity sets, etc.

Figure 6:
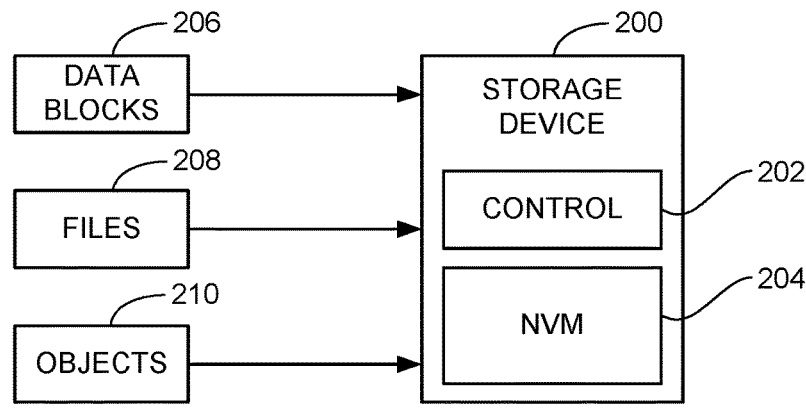
FIG. 6 illustrates another data storage device similar to the devices of FIGS. 1 and 2 configured to store data in respective block, file and object storage environments in accordance with various embodiments of the present disclosure.

FIG. 6 is a functional block representation of another data storage device 200 similar to the devices 100, 110 discussed above. The data storage device 200 includes a controller circuit 202 and an NVM 204. It will be appreciated that the data storage device 200 can be a single device (e.g., a single SSD), or can represent a mass storage system with an array of SSDs or other storage devices operable to provide a larger combined storage space.

The data storage device 200 is configured to process different types of data from a client device. The input data can take the form of data blocks 206, files 208 or objects 210. While the storage device 200 is shown to be able to selectively handle each of these types of inputs, this is merely illustrative and not limiting; other embodiments can configure the device to handle just a single type of data input, such as the data objects 210. Each of these types of data inputs will be discussed below in turn.

Block storage systems that transfer data via the data blocks 206 are highly efficient systems for applications involving intensive data updates and exchanges. Examples include distributed databases, applications, virtual environments and other areas with large numbers of updates, random reads/writes, and bursty (e.g., highly variable) data transfer demands. In this case, the data transport layer is relatively low, enabling the client device(s) to specify the storage and retrieval of data blocks using LBAs or other logical addressing schemes in an efficient manner. Block storage is particularly suitable for DMA (direct memory access), DAS (direct attached storage) and SAN (storage area network) applications.

File storage such as via the files 208 utilize a higher level of abstraction of the interface layer between the client and the storage device. File systems can be useful in environments that involve document sharing among multiple users, clustered databases, large data sets, and other areas where the data sets tend to provide consolidated elements (e.g., media and entertainment, etc.) that are utilized as a unit. Files are often used to provide consistent APIs (application program interfaces) across a number of different platforms.

Object storage such as via the objects 210 utilize even a higher level of abstraction between the client and the storage device levels. As discussed more fully below, objects are usually very large data structures that are utilized as a self-contained unit of data bits. As such, object transfer operations often involve the continuous streaming transfer of the object data to the storage device for storage, and the continuous streaming transfer of the object data from the storage device back to the requesting client.

Figure 7:
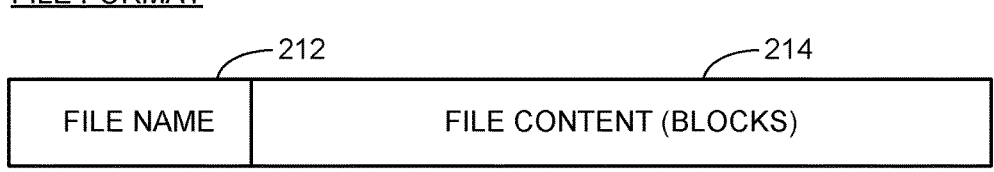
FIG. 7 is an exemplary format for a file that can be stored by the storage device of FIG. 6.
Figure 8:
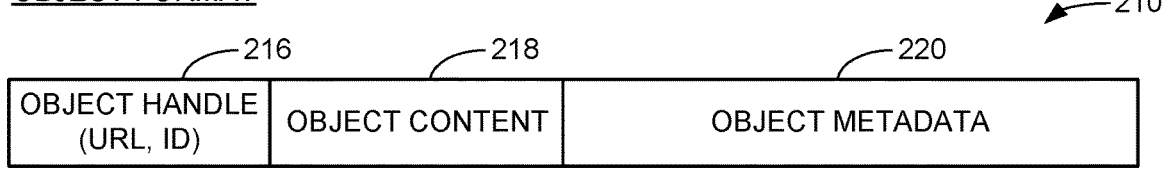
FIG. 8 is an exemplary format for an object that can be stored by the storage device of FIG. 6.

FIGS. 7 and 8 help to describe some of the differences among blocks, files and objects. FIG. 7 shows a simplified format for a selected file 206 from FIG. 6. The file 206 essentially comprises two main elements: a file name 212 and file content 214. The file name 212 will tend to be an alphanumeric descriptor to enable the system to identify the file. The file content 214 will tend to be broken up into a series of fixed sized blocks (e.g., as with the data blocks 208).

A translation structure such as a FAT (not separately shown) can be maintained at the client and/or storage device level to identify the logical addresses of the blocks that make up the file content 214. The file name 212 may be unique within the confines of the local processing system, but is not usually a globally unique identifier. As noted above, in a block storage environment only the blocks (e.g., the content 214) are transferred to the storage device 200, so that the storage device has little or no knowledge of the types, associations or relevance of the data in the respective blocks. In a file storage environment, the entirety of the file (including the file name 212) is provided, enabling the storage device to identify and process the associated blocks accordingly.

FIG. 8 provides a simplified format for a selected object 210 from FIG. 6. The object 210 essentially comprises three (3) main elements: an object handle (or name) 216, object content 218, and object metadata 220. The object handle may be expressed in the form of a URL (universal resource locator), an object identification (ID) value, etc. and provides a unique identifier for the object. While not necessarily required, the object handle may be globally unique. The object content 218 generally comprises data that may be viewed as a user data portion of the object. The object metadata 220 generally comprises data that describes the object content.

It is up to the client system to treat a given set of data as a set of blocks, as a file or as an object. To give a simplified example, consider a digital photograph (image) taken by a digital camera such as in a smart phone. The digital photograph will include an array of pixels that, when interpreted by a display device, provides individual colors to enable the image to be viewed.

Storing the image as a set of blocks would generally involve breaking down the image data into a set of fixed sized blocks, assigning logical addresses (e.g., LBAs) to the blocks, and transferring the blocks to the storage device 200. Storing the image as a file would be similar, except that additional steps would be taken to provide the image with a file name, make the association of the file name with the blocks, and transfer the file to the storage device for storage.

Storing the image as an object would require further abstraction at the client level. The image itself may constitute the object content 218. The object metadata 220 may be accumulated to provide a large amount of data regarding the image. Examples of object metadata can include the date and time when the image was taken, GPS (global positioning system) coordinates for where the image was taken, what device was used to take the image, the user of the device, the copyright owner of the image, the data path taken to upload or otherwise transfer the image, details regarding the content of the image (e.g., the type of image, the number of individuals depicted in the image, the identities of the individuals in the image, etc.), provenance information regarding copies made of the image or indicating the authenticity of the image, error correction or security information, and so on.

From this example it can be seen that the object metadata 220 can, in many cases, be larger than the object content 218. The various constituent elements of the object 210 are not generally usable apart from the rest of the object. Processing of the object may result in further additions to the object metadata, or changes to the object content, but the object is better thought of as an aggregation of data in a consolidated data set rather than a file or a set of blocks, and modification of an existing object such as through changes or additions result in a new object.

While objects of substantially any size can be used, it is generally contemplated that objects will often tend to constitute data sets with relatively large sizes, such as but not limited to several gigabytes, GB ($10^{12}$ bytes), several terabytes, TB ($10^{15}$ bytes), etc. Of course, larger or smaller objects may be used as well. Computer renderings such as in a major motion picture, or the entirety of a motion picture work, are some examples where large objects are utilized. Another commonly employed environment is the configuration of the object as a self-referential and executable entity, such as a software container. In this case, the object content 218 can include executable code (programming instructions) as well as user data utilized by such code. Other examples will readily occur to the reader.

Referring again to FIG. 6, it will be noted that the storage device 200 will operate, at the physical media level, to physically store data bits to the NVM 204 in essentially the same way irrespective of whether the input data are in the form of data blocks 206, files 208 or objects 210. If the NVM 204 is a flash memory as with the memory 140 in FIGS. 2-3, a selected set of flash memory cells will be programmed with accumulated charge to provide persistent storage of the presented data. The controller 202 will generate internal metadata and other information to enable the storage device 200 to subsequently output the stored data when the data are subsequently requested. However, the processing that is carried out by the storage device 200 will be different depending upon the format of the presented data.

Figure 9:
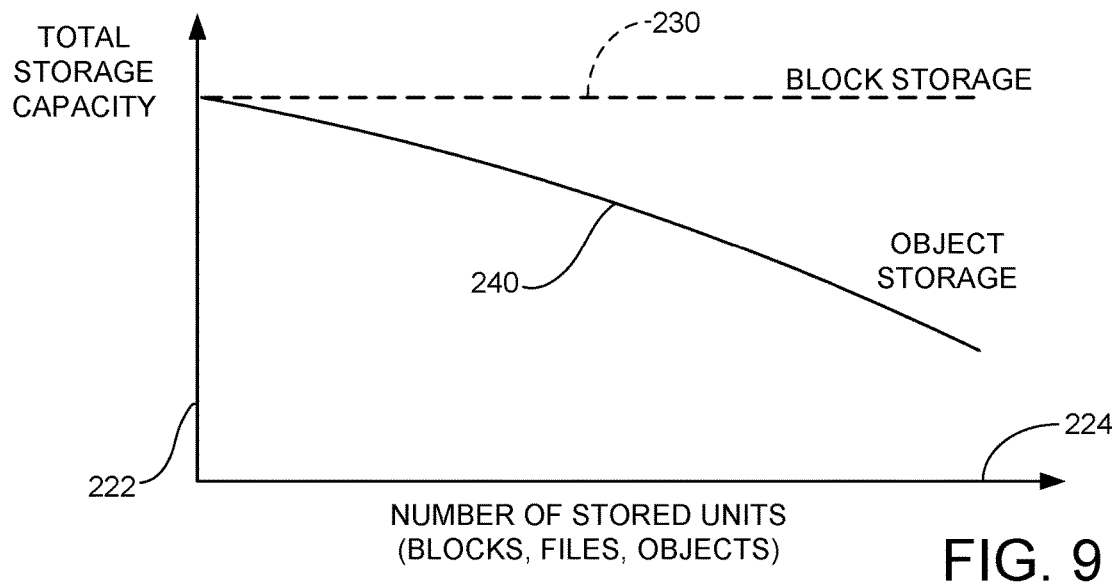
FIG. 9 is a graphical representation of storage capabilities of the storage device for these respective types of data.

One reason for this change in processing by the storage device 200 can be understood with a review of FIG. 9. FIG. 9 represents the available storage capacity of the NVM 204 for different types of input data. This is represented by a vertical y-axis 222. A horizontal x-axis 224 represents a total count (number) of the stored types of units presented to the NVM (e.g., total numbers of blocks 206, files 208 or objects 210).

Dashed line 230 represents the general storage capacity of the NVM when blocks are presented. This value is horizontal and remains constant (setting aside factors that can affect the NVM over time such as wear, overprovisioning requirements, etc.). Stated another way, the NVM 204 will have an overall available number of storage blocks that can be accommodated (e.g., say LBAs 0 to X where X is some large number). This value does not generally change based on how many blocks (data blocks 206, FIG. 6) are presented to the NVM at any given time.

A separate line for the number of files 208 has not been included in FIG. 9. This is on the basis that, ultimately, files can be largely thought of as named groupings of associated blocks. Hence, the block storage line 230 can be used to depict the file storage capabilities of the NVM, at least from an overall data capacity standpoint, independently of the actual number of files.

Line 240 represents the storage capabilities of the NVM 204 with respect to objects 210. Unlike the fixed capacity for files/blocks, the NVM 204 has a variable storage capability with regard to the total number of objects. That is, the larger the number of objects presented for storage, the smaller the overall available storage capacity of the storage device. It will be appreciated that while line 240 is a continuous curve, in practice the relationship may be better viewed as a segmented (non-linear) line. Another way to interpret curved line 240 is that the storage device 200 can store one or a few large objects, or many smaller objects, but as the number of objects increases, the overall remaining data storage capacity increases at a rate that is greater than simply the difference between the amount of storage used and the initial overall capacity.

There are a number of factors that influence the ability of the storage device to store objects in this variable way. One factor relates to the additional metadata that is utilized by the system to account for each object. For clarity, this reference to metadata relates to the storage device metadata, which includes but is not limited to the two-level map metadata 170 shown above in FIG. 5. This storage device metadata is different from the object metadata 220 that forms a portion of the object 210 in FIG. 8. Generally, the greater the number of objects, the larger the processing overhead that will be required by the storage device 200 to track and process the objects. Error correction code (ECC) schemes can also be used that require a larger footprint on a per object basis.

Another factor relates to the physical divisions of objects within a storage device. Depending on the granularity, boundaries between objects may not necessarily easily correspond with physical boundaries within the storage device. For example, if storage units are normally established within the storage device at a certain size (e.g., 128 MB, etc.), then the storage of an object with a non-multiple of this size (e.g., 129 MB, etc.) may require additional overhead to account for and track the remainder portions of the object data.

Figure 10:
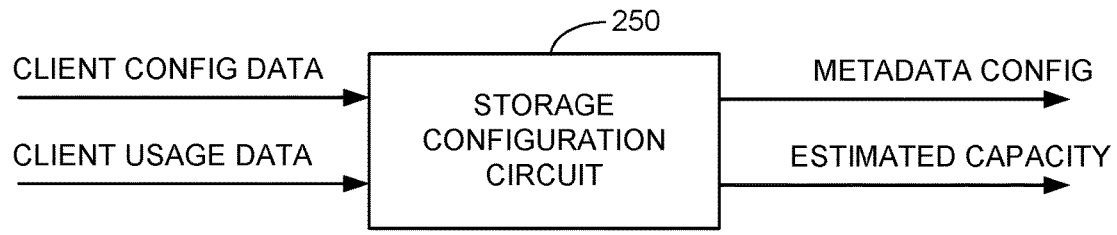
FIG. 10 is a functional block representation of a storage configuration circuit of the storage device of FIG. 6.

FIG. 10 shows a storage configuration circuit 250 of the storage device 200 of FIG. 6. This circuit 250 can correspond to the circuit 130 in FIG. 2 for the SSD 110. The storage configuration circuit 250 operates to establish certain system parameters for the storage device based on the operational environment.

While it is contemplated that the storage device 200 (FIG. 6) can be alternatively configured to handle blocks, files or objects as required, of particular interest is the ability of the circuit 250 to configure the storage device 200 to process objects from one or more client devices (e.g., 101, FIG. 1). Thus, in some cases the circuitry 250 has additional capabilities to detect the type of data being presented (blocks, files or objects) and configure the device accordingly. In other cases, the storage device 200 may be optimized expressly as an object storage device and so, only objects may be stored.

The circuit 250 operates based on a number of input parameters. One parameter relates to client configuration data. These data may be supplied initially by the client device during a configuration phase. A suitable interface can be used to convey this information. A negotiation may take place during this stage to exchange information between the respective devices prior to a data transfer. Examples include the numbers and sizes of the objects to be stored, relevant data associated with the objects such as data types, retrieval needs, protection codes, and other forms of information that can be useful by the storage device in preparing to store the object(s), retrieval frequency requirements of the client device, update requirements by the client device, etc. Because a wide variety of operational environments are envisioned, both now and into the foreseeable future, this data exchange can take substantially any required form in order for the system to be appropriately configured.

Another parameter shown in FIG. 10 to be used by the circuit 250 is client usage data. These data may relate to observed history data obtained by the storage device 200 during use. Unlike the initial data exchange, these inputs will relate to actual operation of the storage device 200 as the device observes and learns the requirements and performance characteristics of the client. Machine learning, AI, neural networks, databases, etc. can all be incorporated into this capability as required.

In response, the circuit 250 provides certain internal configuration outputs. As explained below, different related aspects of the storage device are adaptively selected such as in the areas of GCU layout, ECC scheme, metadata granularity, etc. In further embodiments, the circuit 250 has the capability of providing an estimated remaining capacity of the circuit 250. The estimated remaining capacity can be established in a variety of ways including estimated remaining total storage, estimated remaining number of objects that can be additionally stored, etc. In some cases, a non-linear sliding scale may be supplied such that, for example, with reference again to FIG. 9, the system may report that a larger number W additional objects can be stored with average or maximum sizes of X, and a smaller number Y additional objects can be stored with average or maximum sizes of Z. Other reporting mechanisms and formats can be used.

Figure 11:
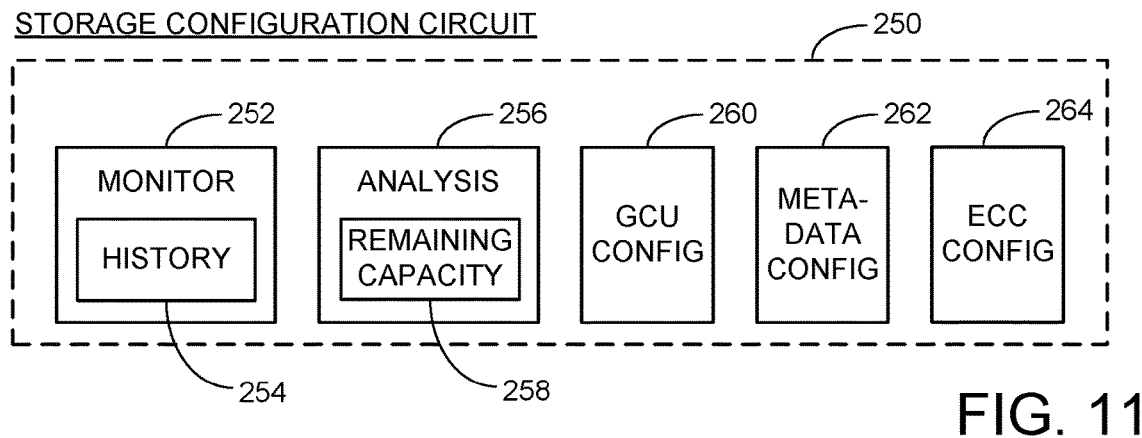
FIG. 11 shows the circuit of FIG. 10 in greater detail in accordance with some embodiments.

FIG. 11 shows a detailed functional block representation of the circuit 250 in some embodiments. Other arrangements can be used. The storage configuration circuit includes a monitor circuit 252, which monitors and processes the system inputs from FIG. 10. As desired, history utilization data may be accumulated and stored in data structure 254 to provide information regarding the manner in which the storage device is being used.

An analysis engine 256 analyzes the system requirements to arrive at a suitable system configuration. The analysis engine may further incorporate a remaining capacity estimator circuit 258 which provides an estimated remaining capacity for the storage device.

The system configuration established by the analysis engine 256 includes adaptive adjustments to GCU size and layout, metadata, and ECC. These respective configurations are implemented by respective modules 260, 262 and 264 as explained below.

Figure 12:
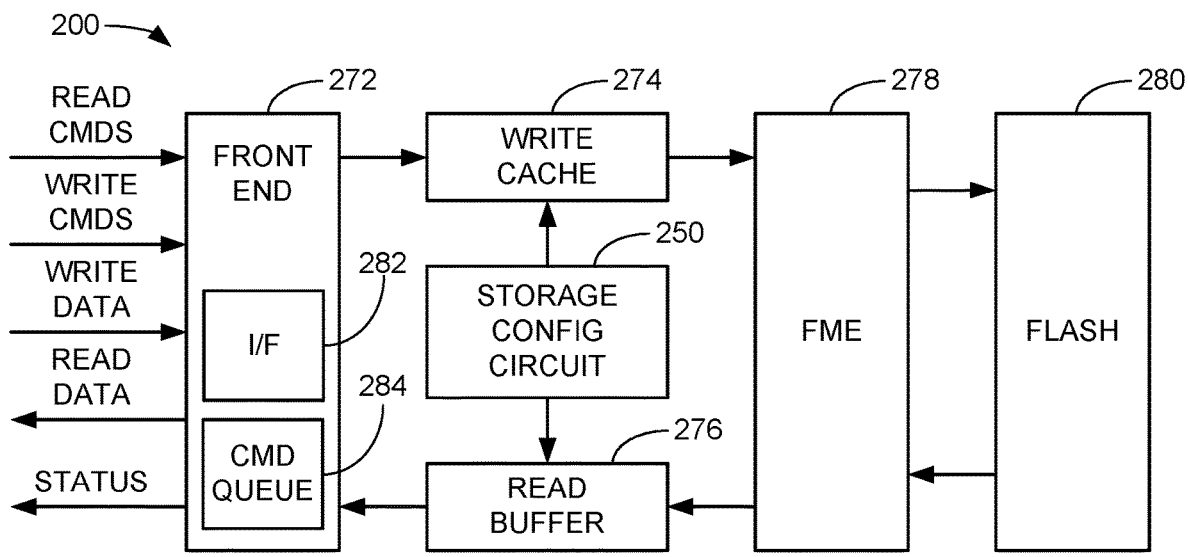
FIG. 12 depicts data path circuitry of the storage device in some embodiments.

FIG. 12 represents internal data paths of the data storage device 200 that are utilized to transfer data to and from the NVM 204 under the direction of the storage configuration circuit 250. In this example, the storage device is an SSD similar to the SSD 110 in FIG. 2. FIG. 12 includes a front end 272, a write cache 274, a read buffer 276, flash memory electronics (FME) 278, and flash memory 280. The front end 272 interfaces with one or more client devices 101 (FIG. 1) using an interface (I/F) circuit 282. Pending access commands may be stored in one or more command queues 284.

During block and file storage operation of the storage device 200, the client(s) may issue various access commands including read and write commands. Each read command will constitute a request for some logical range (e.g., LBA range) of blocks to be retrieved from flash 280. Each write command will constitute a request to store some logical range of blocks to the flash, and will be accompanied by a transfer of the associated writeback data. Object storage operation will be carried out in a different, albeit similar, manner.

Pending commands may be aggregated in the command queue(s) 284 pending execution. Data are written by accumulating the write data into the write cache 274, arranging the data as required, and forwarding the arranged data to the FME 278. The FME 278 in turn directs the storage of the data to the designated location in flash 280. Confirmation and status commands may be exchanged to indicate the command has been carried out successfully. Map metadata updates are carried out as required to identify the physical location for the blocks.

Data are read by forwarding internal read commands to the FME 278, which retrieves the requested data from the flash 280. The retrieved data are processed (e.g., LDPC decoding, decompression, decryption, etc.) and transferred to the read buffer 276. The front end 272 thereafter arranges the transfer of the data from the read buffer to the requesting client.

The data paths shown in FIG. 12 are used during object storage, except that a negotiation may take place first between the client and the storage device as described above, and the data transfer protocol may be somewhat different once the object data are presented for storage. The negotiation obtains necessary information regarding the object to enable the storage device to prepare for receipt.

Figure 13:
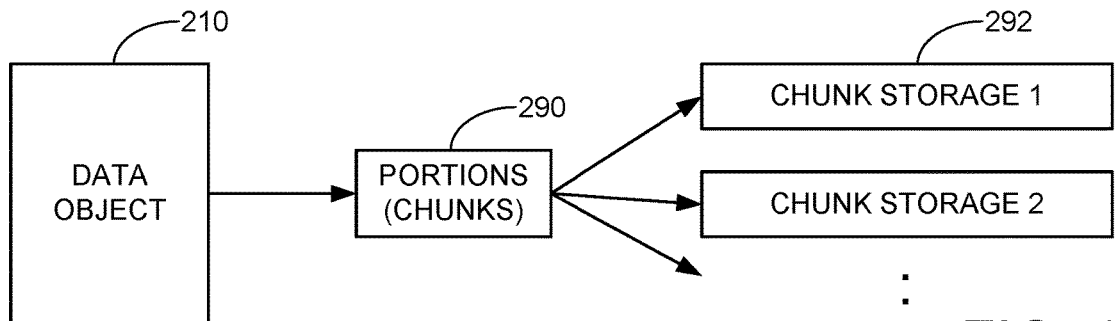
FIG. 13 shows processing of a data object by the circuit of FIG. 10 in some embodiments.

As shown in FIG. 13, an object 210 presented for storage may be divided up into a number of object portions 290. Each portion represents a chunk of object data that can be accommodated by the processing capabilities of the storage device. Each chunk 290 is processed and stored to a different storage location 292 in the flash. Each chunk can be any suitable size including 1 MB (megabyte, $10^6$ bytes), 10 MB, 100 MB, 1 GB, etc. Other sizes larger or smaller than these values can alternatively be used.

Each storage location may be a separate GCU optimized to store the associated portion. As noted above, GCUs (such as 154, FIG. 3) are units of memory that are allocated and erased as a unit. One commonly employed GCU configuration uses a single erasure block 152 from each of a plurality of different dies 144. Among other advantages, this configuration provides a level of reliability since, depending on the parity scheme involved, the stored data can still be recovered even in the event of the catastrophic failure of one (or sometimes multiple) dies. However, because objects are stored and retrieved as a unit, many of the techniques normally employed by the storage device to accommodate random writes and reads at the block level are unnecessary.

Current generation SSDs often store data in 4 KB (4096 byte) blocks of user data in 32 KB (32,768 byte) pages (see e.g., FIG. 4). While the SSD can continue to manage the object data in these size increments, a more suitable format for the object data may be at the page size, so that units of the object data may be divided into 32 KB units, or multiples of 32 KB units. A suitable code rate can be used to provide LDPC protection for each unit.

Figure 14:
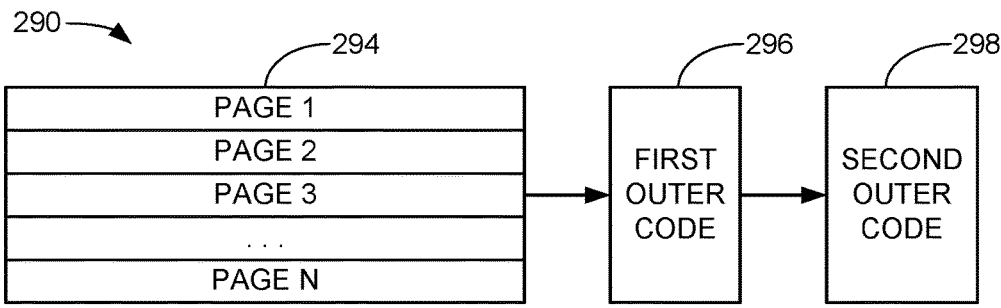
FIG. 14 depicts a chunk storage arrangement from FIG. 13.

FIG. 14 shows a format for a selected portion 290 of an object in some embodiments. The portion is divided into sets of page units 294. In cases where a selected row of the flash memory cells store multiple pages (e.g., the use of MLCs, TLCs, XLCs, etc.), all of the data in all of these pages may make up a page unit. Local code bits can be used to protect the object data bits. In addition, higher levels of error correction codes can be supplied such as a first outer code 296 which protects the group of units 294, a second outer code 298 which protects multiple groups, and so on.

Any number of different types of ECC can be selected for the various levels of encoding, including but not limited to parity values (e.g., exclusive-or, XOR, etc.), Reed Solomon codes, Hamming codes, Bose-Chaudhuri-Hocquenghem codes, etc. As noted above, the object data may itself have separate embedded ECC schemes, but these embedded ECC bits, as well as all other object content and object metadata bits in the object will be treated as user data and separately protected by the storage system ECC scheme.

Figure 15:
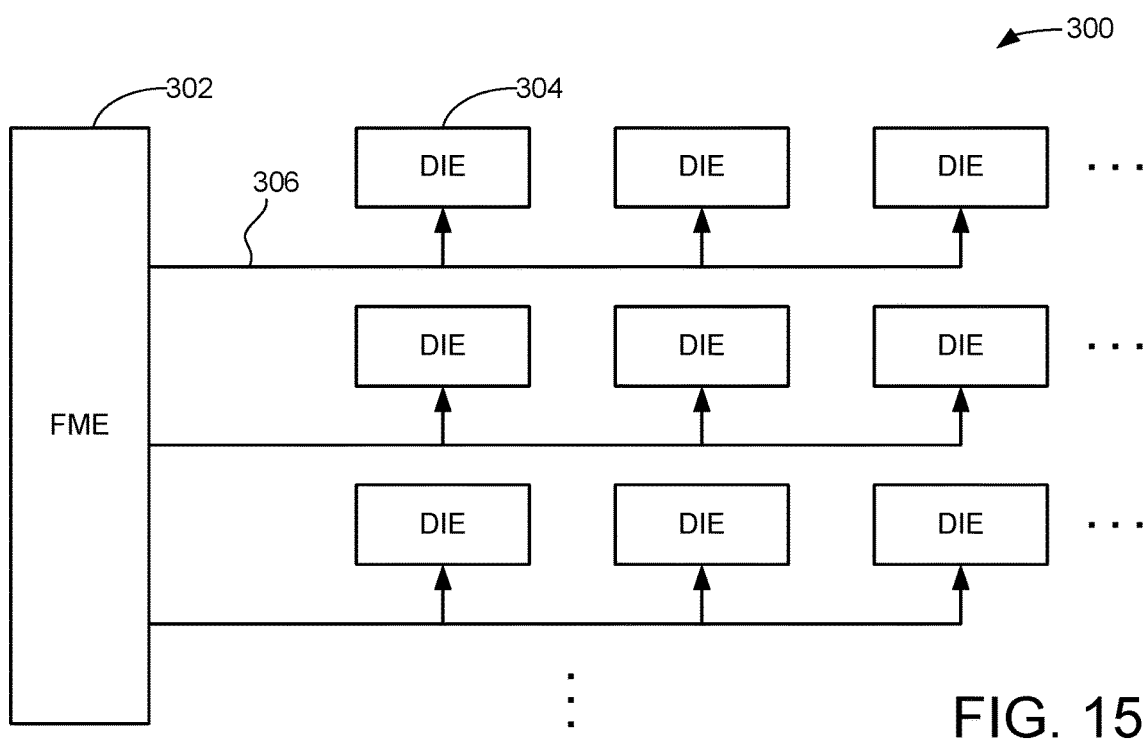
FIG. 15 illustrates aspects of a flash memory of the storage device.

FIG. 15 depicts a portion of flash memory 300 of the storage device. This portion of memory is incorporated into the NVM 204 (FIG. 6) and flash 280 (FIG. 12). The memory 300 is made up of an FME 302 coupled to an array of dies 304 via channels 306. One contemplated configuration uses a total of 256 dies 304 arranged with 16 channels 306 with each channel servicing a die set of 16 dies; an alternative configuration arranges 256 dies with 8 channels so that each die set is made up of 32 dies. Other arrangements can be used. A normal arrangement allows a single die in each die set to be accessed via the associated channel at a time.

A GCU can be arranged in any suitable format to accommodate the chunks 290 from FIG. 14. Different sizes and layouts of GCUs may be appropriate for different applications. In one embodiment, the portions 290 are sized to nominally fill each specially configured GCU. Options include establishing a GCU that uses an erasure block from every die in the system, or from selected groups of dies, so that GCU sizes of 32 dies, 64 dies, 128 dies, 256 dies, or some other number of dies can be utilized. Some amount of overprovisioning capabilities will be maintained within the system to accommodate normal write amplification and data relocation requirements. Nevertheless, since the operational constraints on how the client will request the data may form a part of the initial configuration sequence, the storage and retrieval of the objects, or the portions thereof, can be optimized to support high volume sequential transfers.

In some cases, very large objects may be treated and stored differently from smaller objects. For example, should an entire object be able to be stored in a single GCU (e.g., either an existing system sized GCU or an expanded GCU), the internal ECC and mapping system may elect to treat the smaller object as individual blocks using conventional block storage techniques. Larger objects may be striped across multiple GCUs and provided with parity GCUs or other techniques.

Figure 16:
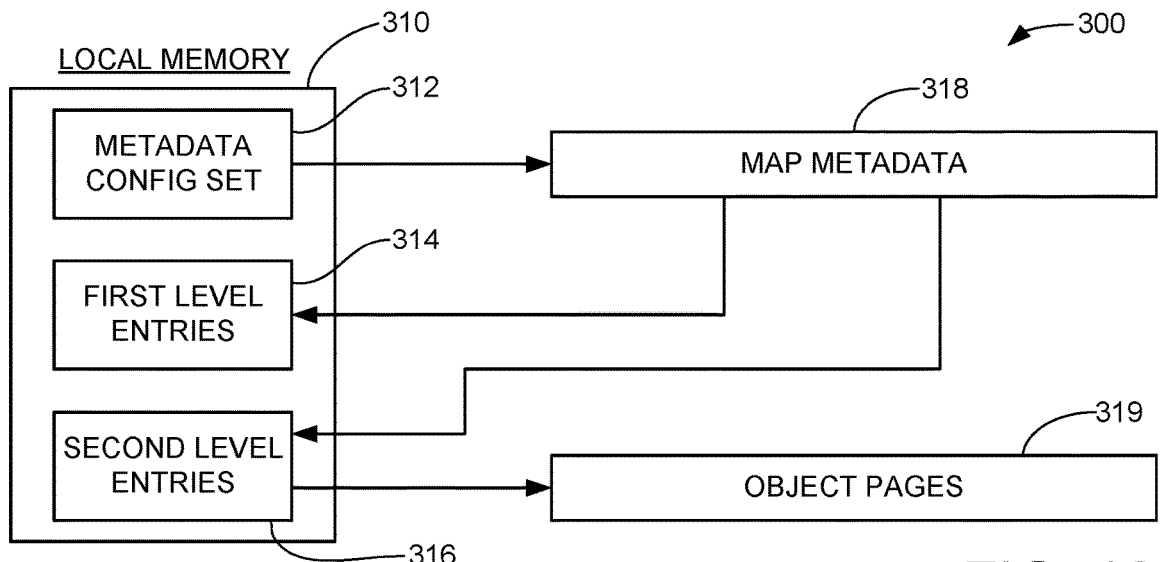
FIG. 16 shows a map metadata arrangement established and used by the circuit of FIG. 10 in some embodiments.

The metadata used to describe the objects may be arranged at the unit level rather than at the block level as in traditional block/file storage environments. To this end, FIG. 16 shows another representation of aspects of the data storage device 200. A local memory 310 stores a number of metadata structures including a metadata configuration set 312. The set 312 provides top level layout of the map metadata used to track each object 210 stored to the memory 300.

If a two-level metadata map is used (see FIG. 5), the set 312 can further provide pointers to addresses at which first level map entries 314 are stored in flash. These entries can be retrieved to the local memory 310 as shown, and used to locate corresponding second level map entries 316 which are also retrieved from the flash and transferred to the local map memory. The second level map entries 316 can describe a block size (e.g., 4 KB) or a larger unit size (e.g., 32 KB, 96 KB, etc.) of units of the object data as desired. The first and second level map entries 312, 314 can be stored in separate map metadata pages 318 in the flash 300. The retrieved second level entries can thereafter be utilized to locate the storage portions 290 of the object (see FIGS. 13-14), which are retrieved from chunk storage pages 319 as shown.

Figure 17:
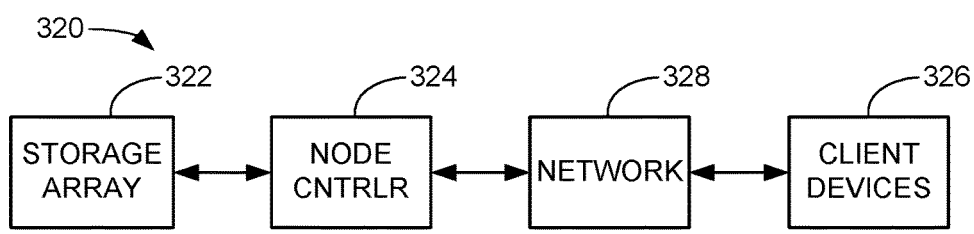
FIG. 17 is a computer network adapted to incorporate the storage device in further embodiments.

FIG. 17 depicts a functional block representation of a computer network 320 in which storage devices such as 200 can be incorporated as described above. The storage device forms a larger storage array 322 which may incorporate tens, hundreds, thousands or more storage devices to provide a larger mass storage space. The storage array 322 may be under the direction of a local node controller 324, which may serve as a storage node in the network 320. Two way communications between the node controller 324 and various remote client devices 326 are passed along an intervening network circuit 328, which can take a variety of forms (e.g., a LAN, a WAN, a private or public cloud network, a data center, the Internet, etc.).

Figure 18:
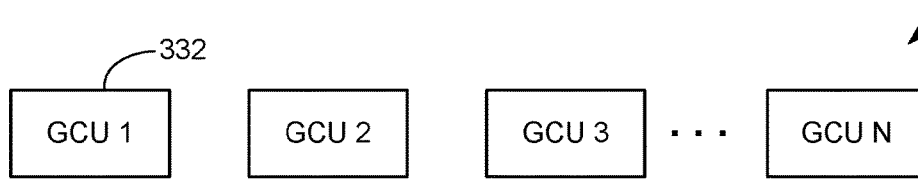
FIG. 18 shows a grouping of stored object data in the form of a set of GCUs in further embodiments.

FIG. 18 shows an object storage space 330 within the flash memory 300 of the storage device 200 in further embodiments. In this example, the input object 210 is divided into N nominally equal sized portions 290, and each portion in turn is stored to a separate GCU 332. The GCUs 332 can be spread out across different die sets (see FIG. 15) and have a tailored size such that the overall storage capacity of the GCU is nominally equal to each object portion. In this scheme, one object may have a first GCU size for the individual portions and another object may have a different, second GCU size. Spare or overprovisioned (OP) GCUs can be supplied as required to facilitate wear leveling, data relocation, etc.

Another advantage to the arrangement of FIG. 18 is that the ECC scheme can incorporate various levels of protection, including at the code word or page level (e.g., for each set of memory cells in a row), at the GCU level (groups of pages or the entire GCU), at a stripe level (e.g., a RAID configuration where one or more of the GCUs 332 are parity values, such as RAID 5-7, etc.), and as desired at an overall level for the entirety of the object data. If the GCU sizes are nominally sized to match the sizes of the object portions and the total number of object portions, then it follows that the total number of erasure blocks/dies in each GCU, as well as the total number of GCUs used to store a selected object, may be a non-standard value (e.g., not a power of two, etc., such as each object portion being stored in a GCU spanning 45 dies, the object stored across 17 GCUs, etc.).

Figure 19:
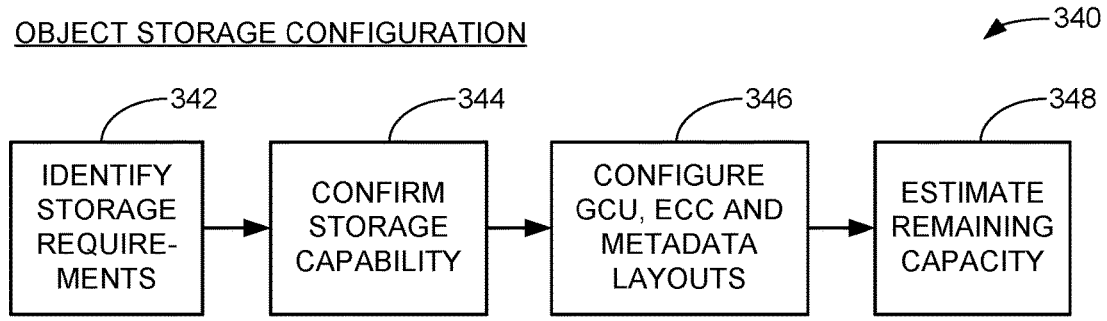
FIG. 19 is a flow diagram for an object storage configuration sequence carried out in some embodiments.

FIG. 19 provides a flow diagram 340 for an object storage configuration sequence. This sequence is carried out initially to prepare for the storage of one or more objects as set forth above. The sequence includes an initial communication phase where a data exchange (sometimes referred to herein as a negotiation) takes place between the client and the storage device(s), followed by an internal configuration phase where the storage device(s) operate to prepare for the storage of the proposed object(s). However, it will be appreciated that in other embodiments, the initial configuration phase can be omitted, since the storage device can be configured to automatically optimize for the storage of objects without prior communications between the client(s) and the storage device(s). For purposes of clarity, the following discussion will contemplate the interplay between a single client and a single storage device (e.g., 101 and 200, respectively).

As shown by block 342, initial configuration requirements are transferred (or otherwise) identified. These can include those set forth above, including size of the object, type of object, etc. At block 344, the storage device confirms that the data storage memory is sufficient to be able to handle the object transfer. At block 346, the storage device makes certain adaptive configuration adjustments to the storage memory space. This can include GCU size and layout, ECC scheme and metadata arrangements.

At block 348, the storage device further outputs an estimated remaining capacity of the storage device at the anticipated conclusion of the storage of the object(s). It will be noted that the estimated remaining capacity can be carried out either prior to or after the object has been transferred. These various steps are carried out by the storage configuration circuit 250 discussed above.

Figure 20:
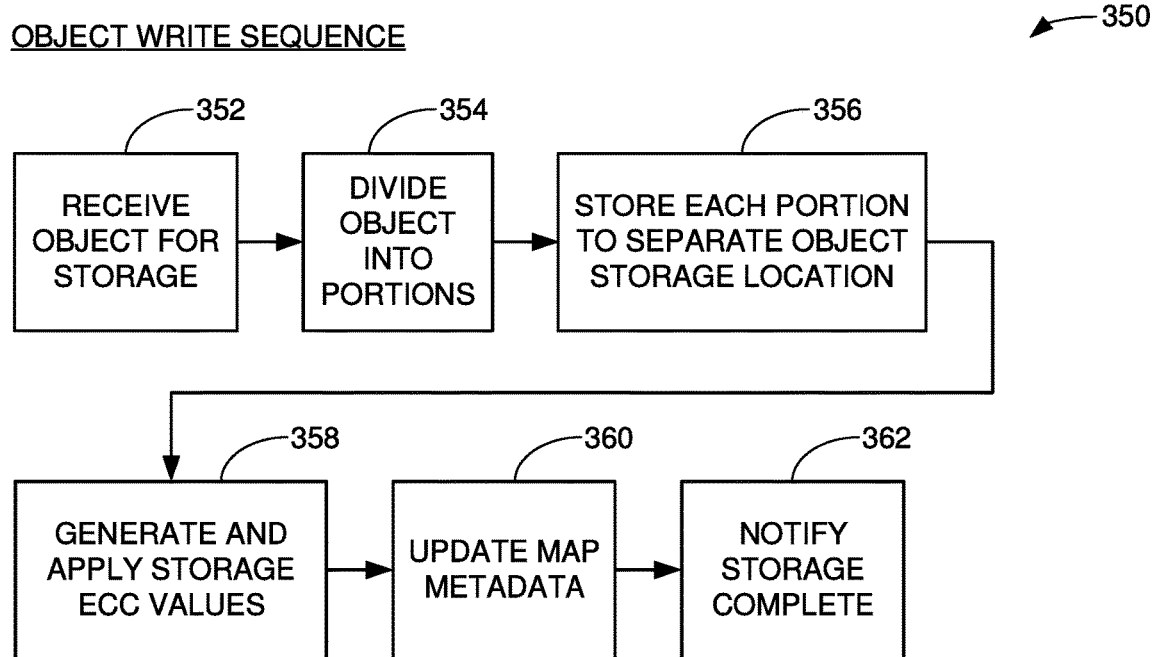
FIG. 20 is a flow diagram for an object write sequence carried out in some embodiments.

FIG. 20 is a flow diagram 350 for an object write sequence. These steps are carried out as described above to transfer the object(s) from the client to the NVM of the storage device. At block 352, the object is presented for storage. This may be carried out as a stream of data that is presented from the client to the storage device, which processes the input data using the internal data paths described above in FIG. 12.

The object data set is divided, as required, into multiple portions, as denoted at block 354. Each portion is thereafter stored in a separate storage location, block 356. Appropriate ECC protection values are generated and stored at block 358, and appropriate metadata are arranged and stored at block 360. The process continues until the entire object has been successfully received and stored to the NVM. As desired, the storage device can provide low, medium and or high level verification operations to ensure the data have been successfully stored to the flash memory. At the conclusion of the transfer, a notification of completion is supplied by the storage device to the client, block 362.

Figure 21:
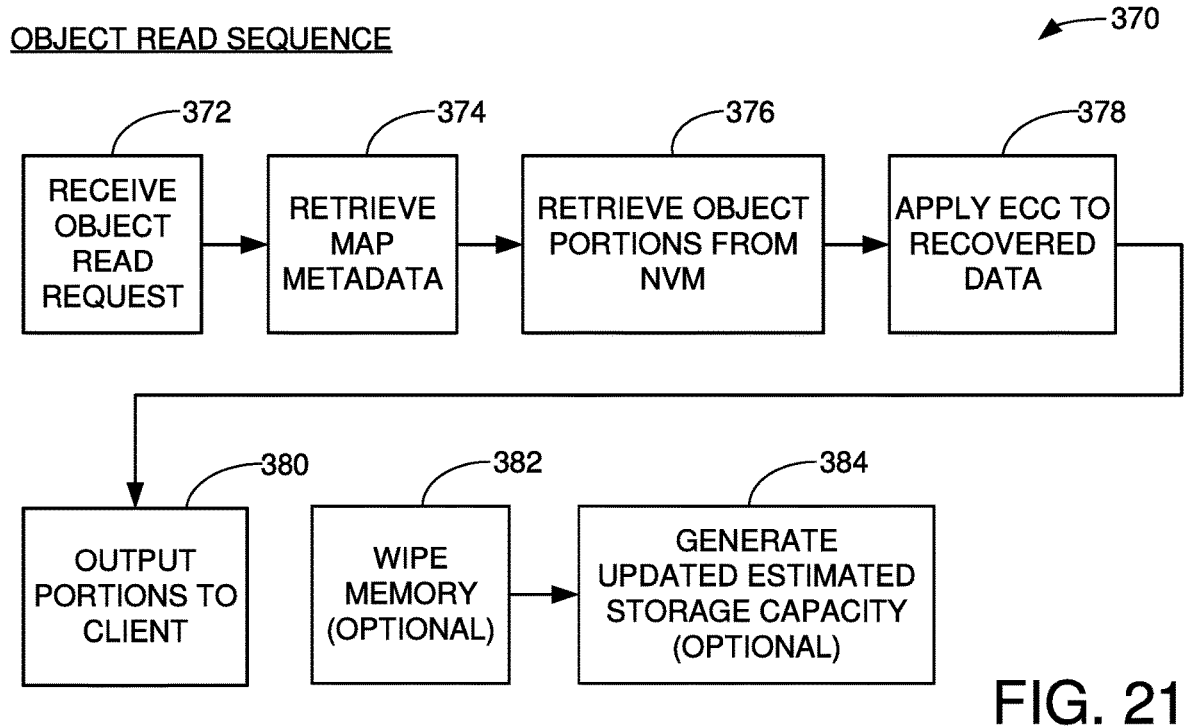
FIG. 21 is a flow diagram for an object read sequence carried out in some embodiments.

FIG. 21 is a flow diagram 370 for an object read (retrieval) sequence. These steps are carried out as described above to transfer the requested object(s) from the NVM back to a requesting client.

As shown at block 372, an object read request is received from an authorized client. It will be presumed that the storage device incorporates suitable data security mechanisms to ensure that data access (read and write) communications are only handled by authenticated entities, so details of such have been omitted for clarity of illustration. Nevertheless, it will be appreciated that data, whether in the form of data blocks, files and/or objects, will neither be stored to, nor retrieved from, the storage device without the presentation of authenticated credentials. Similarly, any other type of information including current storage utilization, estimated future capacity, etc., will likewise not be made available except to an authorized entity.

The receipt of an authorized retrieval request causes the storage device to proceed with the retrieval and transfer of the requested object. This commences at block 374 where the associated map metadata is accessed, such as described above in FIG. 16. This enables the system to locate and retrieve the object portions (or the entire object(s)) from the NVM, block 376.

As required, the ECC values are used at block 378 to correct and detect bit errors in the recovered data, after which the requested data are streamed from the read buffer to the requesting client, block 380.

Blocks 382 and 384 illustrate additional optional operations that may be carried out as desired. These may be carried out using separate commands from an authorized client, but are included in the present flow for convenience. At block 382, a wipe (trim) operation can be carried out to remove the object data from the local storage. This can further include the resetting of various system parameters. Data associated with both the previous write operation and the current read operation can be captured as part of the history data accumulated by the storage configuration circuit 250 (FIG. 6) to enable the system to enhance storage of future objects.

At block 384, another estimation of remaining capacity of the storage device can be supplied. This can occur with or without the wiping of the memory at block 382. As noted above, it is contemplated that the system can estimate, based on current and previous usage, selected GCU and ECC schemes, overprovisioning levels, metadata footprints, and other history and configuration data an estimate of the remaining available data. This estimate can further be adaptively adjusted to be expressed not only as available data storage space, but also in terms of space for additional objects. In some cases, this estimate can further be verified by a system check at the presentation of a new object (see e.g., step 342 in FIG. 18).

In this way, the storage device can adaptively operate to configure the NVM to optimize storage for objects, and can provide an accurate estimate of additional object storage capabilities. Objects of substantially any size and form can be efficiently stored, including but not limited to software containers, audio-visual works, block chain structures, etc. Because object storage does not necessarily require the storage device to retain the ability to individually access, update and track individual units of data (e.g., 4 KB blocks, etc.), certain efficiencies of scale can be implemented that are better suited to match the needs of the overall object size and structure.

While the various embodiments discussed herein have been described in terms of an SSD in an NVMe environment, other types of storage devices and operational environments can be used as desired. Flash memory is a particularly suitable NVM, but other forms of data storage memory can be used.

It is to be understood that even though numerous characteristics and advantages of various embodiments of the present disclosure have been set forth in the foregoing description, together with details of the structure and function of various embodiments of the disclosure, this detailed description is illustrative only, and changes may be made in detail, especially in matters of structure and arrangements of parts within the principles of the present disclosure to the full extent indicated by the broad general meaning of the terms in which the appended claims are expressed.

What is claimed is:

1. A method comprising:
receiving, from a client device, data arranged as an object for storage to a non-volatile memory (NVM) of a data storage device;
adaptively adjusting a garbage collection unit (GCU) layout of the NVM to accommodate the storage of the object by dividing the data object into object portions, configuring a GCU that spans multiple die sets of the NVM having an overall data storage capacity that nominally matches an overall size of a selected one of the object portions, and storing the selected one of the object portions to the GCU;
generating a predicted remaining storage capacity of the NVM in terms of additional objects that can be stored by the NVM responsive to the adaptively adjusted configuration of the NVM; and
reporting, to the client device, the predicted remaining capacity of the NVM.

2. The method of claim 1, wherein the GCU layout comprises an arrangement of storage units that span multiple separate semiconductor memory dies in the NVM that are allocated and erased as a unit.

3. The method of claim 1, wherein the configuration of the NVM is adjusted by changing an error correction code (ECC) scheme of the NVM, and wherein the ECC scheme provides error detection and correction capabilities for bit errors in the object data.

4. The method of claim 1, wherein the configuration of the NVM is adjusted by changing a map metadata format used by the NVM, and wherein the map metadata format comprises second level map entries utilized as an address translation layer to translate logical to physical addresses of portions of the object data within the NVM, and first level map entries utilized to locate physical addresses within the NVM of the second level map entries.

5. The method of claim 1, wherein the configuration of the NVM is adjusted by changing each of a GCU layout, an ECC scheme and a map metadata format of the NVM.

6. The method of claim 1, wherein the predicted remaining storage capacity of the NVM is a sliding, non-linear scale that indicates different total numbers of objects based on size ranges of the objects that can be accommodated for storage by the NVM.

7. The method of claim 1, wherein the die sets comprise flash memory dies coupled to a flash memory electronics (FME) front end using a plurality of channels.

8. The method of claim 7, wherein the GCU is a first GCU and the selected one of the object portions is a first object portion, wherein the adaptively adjusting step further comprises formatting an additional number of GCUs each sized to store a remaining one of the remaining object portions, wherein each object portion is nominally the same size.

9. The method of claim 7, wherein the flash memory dies comprise flash memory cells arranged into erasure blocks constituting a smallest grouping of the memory cells that can be erased at a time, each erasure block comprising a plurality of rows of memory cells sharing a common word line, wherein each of the GCUs comprise at least one erasure block from each of the associated dies, and wherein map metadata are arranged to describe the object data written to each row of memory cells in each of the GCUs.

10. The method of claim 1, further comprising subsequent steps of storing a set of blocks from the client device to the NVM during retention of the object in the NVM, the blocks individually addressed via logical block addresses (LBAs).

11. The method of claim 1, further comprising a prior step of engaging in a data exchange between the client device and the storage device prior to the receiving of the object from the client device, the data exchange identifying an object handle for the object and an overall size of the object, wherein the configuration of the NVM is adaptively adjusted by a controller of the storage device responsive to the object handle and the overall size of the object.

12. A data storage device configured to store objects from a client device, each object comprising a self-contained set of data bits having an object handle, object data and object metadata to describe the object data, the data storage device comprising:
  a non-volatile memory (NVM); and
  a controller configured to, responsive to a data exchange with the client device, divide the data object into object portions and configure a garbage collection unit (GCU) that spans multiple ones of the flash memory dies in multiple ones of the die sets having an overall data storage capacity that nominally matches an overall size of a selected one of the object portions before storing the selected one of the object portions to the GCU, the controller configured to adaptively adjust at least a selected one of a GCU layout, an error correction code (ECC) scheme or a map metadata format of the NVM to accommodate storage of a selected object from the client device to the NVM, and to report, to the client device, a predicted remaining storage capacity of the NVM in terms of additional objects that can be stored by the NVM responsive to the adaptively adjusted NVM.

13. The data storage device of claim 12, wherein the GCU layout comprises an arrangement of GCUs that span multiple separate semiconductor memory dies in the NVM that are allocated and erased as a unit, and wherein the controller is further configured to divide the selected object into a plurality of nominally equal sized object portions and store each of the object portions to a different one of the GCUs.

14. The data storage device of claim 13, wherein the arrangement of GCUs has a total number of GCUs that is not a power of two.

15. The data storage device of claim 13, wherein the object portions are striped across the GCUs and are protected by at least one additional GCU that stores parity values in accordance with a selected RAID configuration.

16. The data storage device of claim 12, wherein the map metadata format comprises second level map entries utilized as an address translation layer to translate logical to physical addresses of portions of the object data within the NVM, and first level map entries utilized to locate physical addresses within the NVM of the second level map entries.

17. The data storage device of claim 12, wherein the NVM comprises a flash memory comprising a plurality of flash memory dies coupled in die sets to a flash memory electronics (FME) front end using a plurality of channels.

18. The data storage device of claim 12, wherein the map metadata format describes units of the data bits of the object at a first granularity responsive to the overall size of the object being less than a selected threshold, and wherein the map metadata format describes unites of the data bits of the objects at a second granularity responsive to the overall size of the object being greater than the selected threshold.

19. The data storage device of claim 18, wherein the first granularity describes units of 4 KB in size and the second granularity describes units of a multiple of 4 KB in size.

20. The data storage device of claim 12, further configured to concurrently store data from the client device using a block storage environment and a file storage environment.

* * * * *